Figure 1:
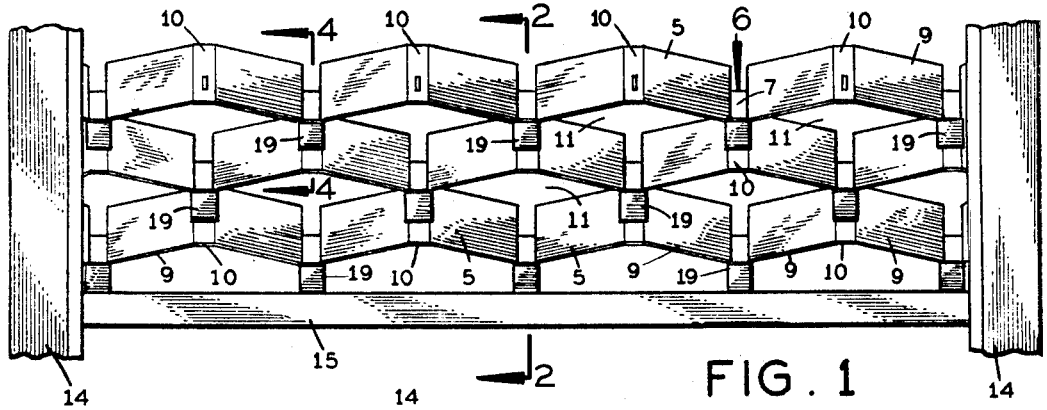

Sept. 20, 1966  R. L. JORDAL  3,273,298
RETICULATED SUN SHADE OR GRILL

Filed April 2, 1964  2 Sheets-Sheet 1

INVENTOR.
ROBERT L. JORDAL
BY
AT TORNEY

Sept. 20, 1966  R. L. JORDAL  3,273,298
RETICULATED SUN SHADE OR GRILL
Filed April 2, 1964  2 Sheets-Sheet 2
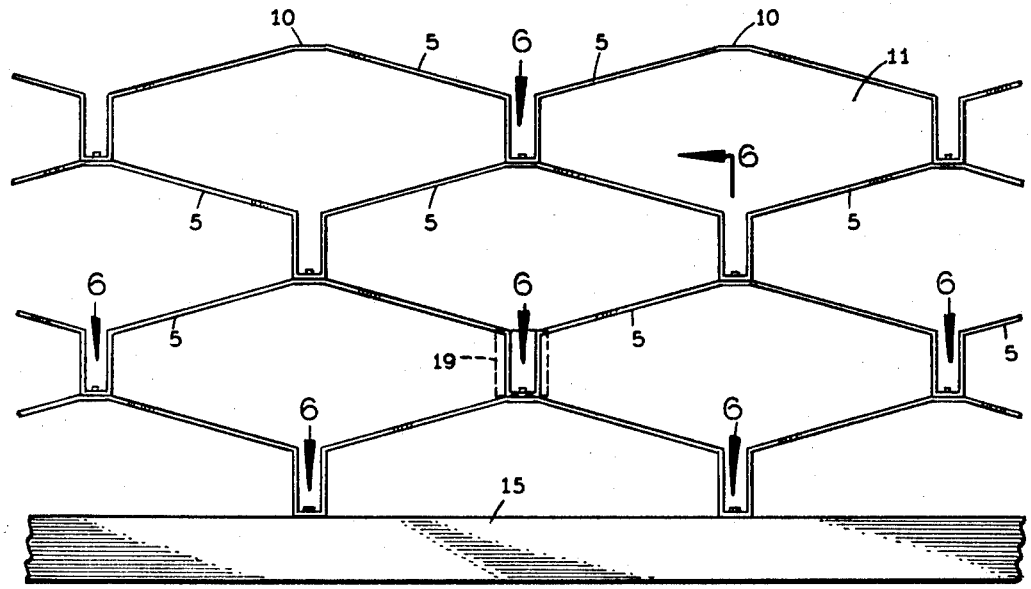
FIG. 5
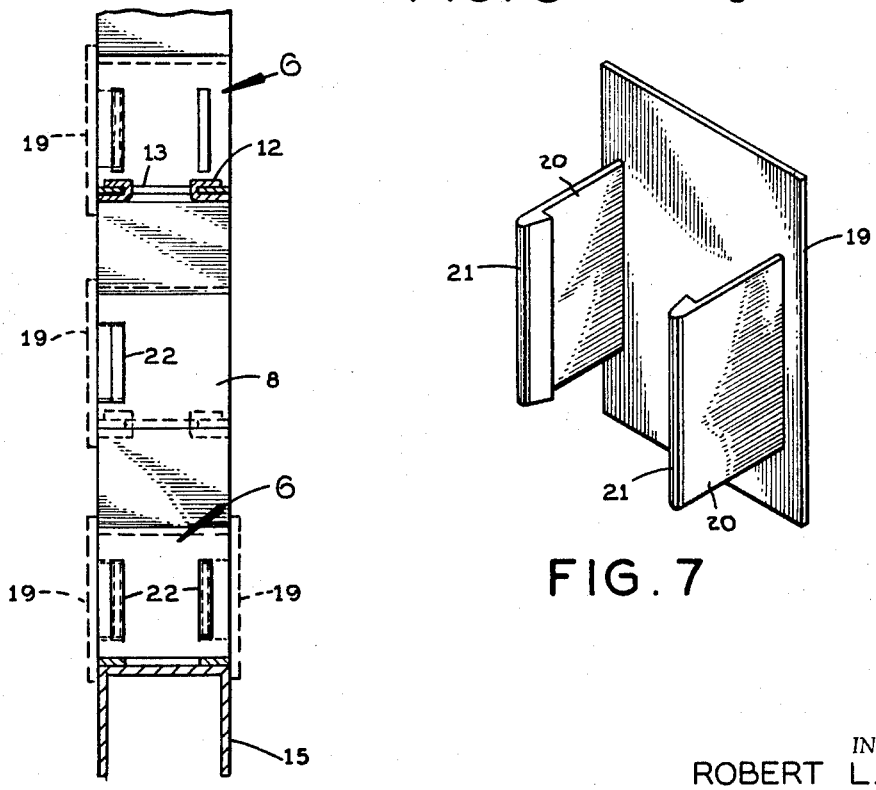
FIG. 6
FIG. 7
INVENTOR.
ROBERT L. JORDAL
BY
ATTORNEY

United States Patent Office 3,273,298
Patented Sept. 20, 1966

3,273,298
RETICULATED SUN SHADE OR GRILL
Robert L. Jordal, Fort Lauderdale, Fla., assignor to Al-Vent Inc., Fort Lauderdale, Fla., a corporation of Florida
Filed Apr. 2, 1964, Ser. No. 356,791
7 Claims. (Cl. 52—473)

This invention relates to sun shades or grills primarily for application to and in overlying relation, to windows and doors for preventing the direct rays of the sun from passing to the interior of a building and to also permit of a free flow of ventilating air.

The sun shade or grill is formed of a multiplicity of flat metallic strips that are pre-shaped to form various designs and with the strips being substantially identically formed and arranged in staggered relation, with a first and second strip constituting the particular design of an opening.

Basically the invention contemplates the use of a honeycomb lattice structure which covers the entire expanse of the window or door through which direct sun light may penetrate and the grill is obviously dimensioned to cover a specific opening and either directly attached to a wall in which the opening is formed or to be slightly spaced outwardly away from the wall. One major aspect of this invention is that the individual cells of the honeycomb formed by the strips have their axes oriented at an acute angle to the plane of the door or window to be shaded and the cell depth is made sufficiently long so that direct sun light may only pass through the cells when the sun is so low in the sky that the heating effect of the penetrating rays is negligible. Also, it is a primary object of the invention to provide a novel sun shade which provides substantially complete shielding from the rays of the sun over the entire surface of a window or door and which at the same time allows for substantially major light transmission and ventilation through the shade to the interior of the shaded area.

It is another object of this invention to provide a novel sun shade of relatively flat construction which is materially less susceptible to the destructive effects of sudden sharp gusts of wind.

Novel features of construction and operation of the device will be more clearly apparent during the course of the following description, reference being had to the accompanying drawings wherein has been illustrated the preferred forms of the device and wherein like characters of reference are employed to denote like parts throughout the several figures.

Figure 2:
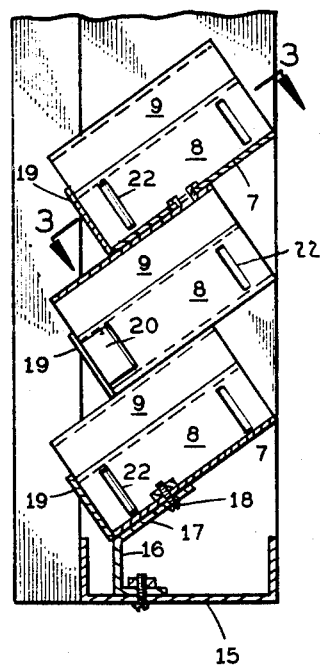
Figure 3:
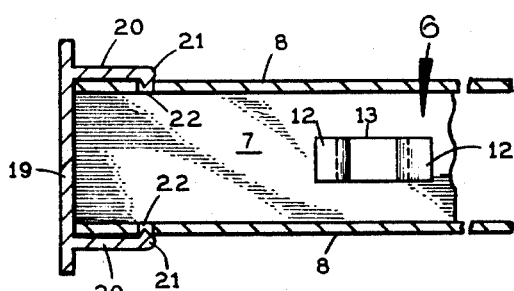
Figure 4:
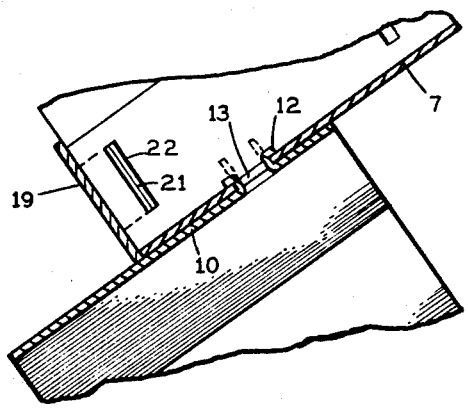

In the drawings:

FIGURE 1 is a fragmentary outer side elevation of a grill constructed in accordance with the invention, FIGURE 2 is a vertical transverse section taken substantially on line 2—2 of FIGURE 1, FIGURE 3 is a horizontal section taken substantially on line 3—3 of FIGURE 2, FIGURE 4 is a fragmentary transverse vertical section taken substantially on line 4—4 of FIGURE 1, FIGURE 5 is an outer side elevation of a modified form of the device, FIGURE 6 is a vertical transverse section taken substantially on line 6—6 of FIGURE 5, and FIGURE 7 is a perspective view of a clip-on decorative closure for the open ends of channels that constitute spacers between the several grill forming strips.

Referring specifically to the drawings and particularly to FIGURES 1–4 inclusive, there has been provided a grill that comprises a multiplicity of flat metallic strips 5. Each alternate strip 5 is bent to form equidistantly spaced channels 6 and with the channels having a bottom wall 7, vertical side walls 8 and the vertical side walls of each channel 6 is inclined upwardly as shown at 9 to form a substantially flat intermediate section 10. The strips are so arranged in substantially parallel relation whereby the flat section 10 underlies the bottom wall 7 of a next adjacent section and primarily with respect to the bottom 7 of the channels 6. The strips are thus staggered with respect to each other to form the openings 11 throughout the area of the grill. These openings may vary in design but basically, they are formed by the several strips 5 and the strips are dimensioned transversely to form a depth of approximately three inches although, this depth may be varied in accordance with any particular construction.

Each of the strips 5 have their flat intermediate area 10 provided with struck-out tongues 12 and the bottom wall 7 of the several channels are slotted at 13 to receive the tongues 12 and as shown in FIGURE 4, the tongues 12 are first bent upwardly and then downwardly after passing through the slots 13, forming a very rigid connection between the several panels. The several panels 5 are acutely angled as shown and the tongues 12 positively positions each of the strips 5 with respect to adjacent strips and maintains the strips in an angular parallel relation, as shown in FIGURE 2 and whereby the marginal edges of the strips are retained in the same vertical plane.

The several groups of strips 5 forming the grill are mounted at their ends within mullions 14 and the lowermost strip is supported within a base channel 15, connected to the mullions in any desirable manner. Mounted within the base of the channel 15 is a fixed bracket 16, having an angular tongue 17 that is angled in accordance with the angularity of the grill. Each lowermost channel of the lowermost strip is preferably connected with the tongue 17 by bolts 18 thus maintaining the grill at a predetermined angle with respect to the opening to be protected. The strips, the mullions and the channel 15 are preferably anodized and the several elements are preferably formed of aluminum.

Each of the channels 6 are normally open at the front and rear of the grill and to close the channels upon the forward or face of the grill, there has been provided ornamental and vari-colored plates 19, see particularly FIGURE 7. Each of the plates 19 are provided with right angle tongues 20 that terminate in hooked ends 21. The tongues 20 are adapted to slide over the outer sides of the channel walls 8 to a point where the plate 19 has abutting engagement with the ends of the walls 8. At this point, the hooks 21 snap into slots 22 formed in the side walls 8 and effectively maintain the plates in overlying relation to the channels 6 thus creating a very decorative addition to the grills. While the plates 19 have been illustrated as covering the forward open sides of the channels 6, it will be apparent that the same cover plates 19 may be employed to cover the rear open ends of the channels.

In the operation of this form of the invention, it first being determined the particular size of an opening to be protected, mullions or other frame members are supported upon the building or, the mullions and the entire grill may be previously formed and installed, the lowermost strip 5 is first attached to the brackets 16 and the additional segments of strips 5 are then interlocked by the tongues 12, forming a relatively rigid protective grill for controlling the entry of sun light to a wall opening and to also form the various openings 11 for the free passage of air through the grill and to the wall openings. After the grill has been assembled, the decorative plates 19 are snapped into engagement with each channel end 6 and the entire assembled grill supported upon the wall in any desirable manner. The several strips 5 may be connected to the mullions 14 through the medium of tongues formed upon the opposite ends of the strips that fit within angular slots in the mullion and subsequently bent to securely anchor the ends of the strips to the mullions.

With respect to FIGURES 5 and 6, the grill structure is substantially identical to that previously described and here formed of a plurality of flat strips 5, having the channels 6 and the channels 6 are connected to adjacent strips by the passage of the tongues 12 through the flat apexes 10. In this form of the invention, the grill provides the same openings 11 but here, the strips are disposed in a non-angular arrangement with respect to the frame member 15 and whereby the several openings 11 are horizontally disposed through the grill. As in the first form of the invention, the side walls 8 of the channels 6 are slotted at 22 to receive the hooks 21 of the plates 19, this method of closing the channels being identical to that previously described. In all other respects, the grill of FIGURES 5 and 6 is substantially the same as the first form of the invention with the exception that the transverse openings 11 are horizontally disposed rather than the angular arrangement of the openings 11 in the first form of the device.

It will be apparent from the foregoing that a very novel form of grill has been provided, the structure is simple, is strong, durable and provides a very novel type of grill that constitutes a shade for windows, doors or the like. The several strips 5 are identically formed and of course the design of opening 11 may be varied without departing from the basic principles of the device. With the strips 5 being preformed, with the channels 6, the several strips may be quickly and easily assembled with respect to the frame and with respect to each other and the several cover plates 19 for the channels 6 may be quickly and easily installed after the grill has been assembled. It is contemplated that the plates 19 may be anodized in various colors in contrast to the anodizing of the strips 5.

It is to be understood that the invention is not limited to the precise construction shown, but that changes are contemplated as readily fall within the spirit of the invention as shall be determined by the scope of the subjoined claims.

I claim:

1. A sun shade or grill for mounting to the exterior of a window or door comprising a multiplicity of elongated metallic strips having their ends anchored in a metallic frame, the several strips being shaped at equidistantly spaced points throughout their length to form channels and between each pair of channels the strip is inclined upwardly to form a flat apex that is intermediate each adjacent channel, each alternate strip being staggered whereby the flat apex underlies the bottom of a channel of the next adjacent strip, means in the bottoms of the channels and the apex to fixedly lock the strips together and to form transverse cells of like configuration that extend entirely through the grill, the channels being open throughout and ornamental cover plates for closing the ends of the channels, the several cells constituting air passages through the grills and to the window or door adjacent to the grill, the grill having a depth calculated to exclude the passage of sun light therethrough for the major number of hours of the day.

2. The structure according to claim 1, wherein each of the cells have an axis geometrically centered relative to the cell side walls, said cells being so oriented within the grill that the said axes are inclined at acute angles to the plane of the grill.

3. The structure according to claim 1 wherein the several strips are horizontally disposed within the frame and wherein the several cells are horizontal tranversely.

4. The structure according to claim 3 wherein the several strips are shaped intermediate their lengths to form a transverse channel having side walls and a bottom and with the side walls at their upper ends being angled outwardly and upwardly to form a flat apex between each adjacent pair of channels, the strips being staggered horizontally to dispose the apex of one strip against the bottom of the channels of the next adjacent strip and with a pair of strips forming an ornamental cell through the grills from front to back, each of the flat apexes being provided with struck-out tongues that extend upwardly through slots formed in the bottom of the channels and whereby to anchor the strips rigidly together, the several strips being supported within a rigid frame and with the strips being disposed horizontally and with the marginal edges of the strips being disposed in a vertical plane, the side walls of the channels being slotted and cover plates that overlie the ends of the channels, the cover plates being provided with hooked tongues that have snapping engagement into the slots, the said cells being of diamond shape and constituting passages through the grill for the passage of air, the said strips having a width calculated to prevent the passage of sun light.

5. A sun shade or grill for mounting to the exterior of a window or door, comprising a multiplicity of elongated metallic strips, a frame for supporting the grill and with the frame comprising mullions and a cell channel, the several strips being supported upon the cell channel and with their opposite ends being anchored to the mullions, the several strips being identical and with the strips shaped intermediate their ends and in equidistantly spaced relation to form transverse channels, the channels having a bottom and vertical side walls, the strips from the side walls being angled upwardly to form a flat apex, each alternate strip being staggered whereby each apex underlies a bottom wall of the channel and whereby to form ornamental cells, the opposite ends of the channels being open, each apex having interlocking tongues struck therefrom to engage through slots formed in the bottom wall of the channels and wherey to lock the several strips together throughout the height of the grill, the said cells having an axis geometrically centered relatively to the cell side walls, the said cells being so oriented within the grill that their axes are inclined at acute angles to the plane of the grill, a lowermost strip being anchored to fixed brackets carried by the cell, the said brackets being angled in accordance with the angularity of the cells and whereby the lowermost strip is maintained at a fixed angle and with each of the upper strips being maintained at a fixed angle and with each of the upper strips being maintained at a corresponding end with all of the strips being disposed in a common vertical plane, the said cells constituting air passages through the grill and with the orientation of the grill constituting a barrier against the entry of sun light through the cells.

6. The structure according to claim 5 wherein each side wall of the channel is slotted, and horizontal closure plates for the ends of the channels with the closure plates being provided with hooked tongues that have snapping engagement into the slots.

7. The structure according to claim 6 wherein the several strips, the frame and the closure plates are formed of aluminum.

References Cited by the Examiner

UNITED STATES PATENTS

| | | | |
|---|---|---|---|
| 1,868,108 | 7/1932 | Lachman | 52—666 |
| 1,901,869 | 3/1933 | Duffy | 52—716 X |
| 2,239,871 | 4/1941 | Bell | 52—663 X |
| 2,895,573 | 7/1959 | Hill | 52—666 |
| 3,197,820 | 8/1965 | Au Claire et al. | 52—473 |

HARRISON R. MOSELEY, *Primary Examiner.*

P. C. KANNAN, *Assistant Examiner.*